United States Patent [19]
Wainwright

[11] Patent Number: 6,151,439
[45] Date of Patent: Nov. 21, 2000

[54] APPARATUS AND METHOD FOR IMPLANTING OPTICAL FIBERS IN FABRIC PANELS AND THE LIKE

[75] Inventor: H. Lee Wainwright, Bethlehem, Pa.

[73] Assignee: ANI-Motion, Inc., Bethlehem, Pa.

[21] Appl. No.: 09/262,222

[22] Filed: Mar. 4, 1999

Related U.S. Application Data

[60] Continuation-in-part of application No. 09/023,807, Feb. 12, 1998, Pat. No. 5,881,206, which is a division of application No. 08/581,442, Dec. 29, 1995, Pat. No. 5,738,753.

[51] Int. Cl.[7] .................................................... G02B 6/04
[52] U.S. Cl. .................... 385/147; 385/901; 156/62.4; 156/379.8
[58] Field of Search ................................. 385/147, 115, 385/901; 156/62.4, 379.8; 359/900

[56] References Cited

U.S. PATENT DOCUMENTS

| | | | |
|---|---|---|---|
| 2,557,668 | 6/1951 | Lincoln | 156/78 |
| 3,993,523 | 11/1976 | Hunt et al. | 156/253 |
| 4,854,250 | 8/1989 | Stivecke et al. | 112/80.16 |
| 4,875,144 | 10/1989 | Oppenheimmer | 385/147 |
| 5,000,535 | 3/1991 | Churchill | 385/901 |
| 5,186,776 | 2/1993 | Boyce et al. | 156/93 |
| 5,295,216 | 3/1994 | Halter | 385/147 |

*Primary Examiner*—Hung N. Ngo

[57] ABSTRACT

An apparatus for implanting one or more optical fibers in a panel having a uniform planar surface is comprised of a frame for supporting a fiber inserter above a fiber insertion table which fiber inserter carries the optical fiber downward to the fiber insertion table piercing the interposed panel at a desired point of insertion and carrying the optical fiber to the underside of the panel through an opening in the fiber insertion table. Adhesive is applied surrounding both the tip of the optical fiber on the underside of the panel and surrounding the optical fiber on the top side of the panel. Exposure to a curing mechanism causes a change of state of the adhesive resulting in the permanent adherence of the optical fiber to both sides of the panel at the point of insertion.

23 Claims, 5 Drawing Sheets

APPARATUS AND METHOD FOR IMPLANTING OPTICAL FIBERS IN FABRIC PANELS AND THE LIKE

CROSS-REFERENCE TO RELATED APPLICATION

This application is a continuation-in-part of U.S. patent application Ser. No. 09/023,807, filed Feb. 13, 1998, now U.S. Pat. No. 5,881,206, which is a division of U.S. patent application Ser. No. 08/581,442, filed Dec. 29, 1995, now U.S. Pat. No. 5,738,753.

BACKGROUND OF THE INVENTION

Optical fibers have been recently utilized for reliable transmission of band-width controlled lightwaves for transmitting telecommunication signals over long distances without significant loss or decay of the original signal. Other uses for optical fibers, primarily as an off-shoot of the basic telecommunications usages, were for the purposes of aesthetic displays of colored light. However, organized displays of colored light produced through the transmission of such light through optical fibers in a patterned array are extremely rare and not commonly accepted or used for display purposes to promote the sale of goods or services, or for entertaining illustrations.

Virtually non-existent are such displays which are capable of imparting organized motion to the display so that the illuminated optical fiber illustration creates the illusion of continuing, sequential motion across one or more display panels. Each display panel supplies a semi-rigid base or planar surface for supporting the fiber optic display in the desired patterned array so that the ends of each optical fiber, arranged individually or in organized bundles, create the pre-determined and desired illuminated effect of the fiber optic display.

However, the single or bundled optical fibers must be implanted by hand into the displays and as yet there is no machine available to do the required operation effectively. The reliable implanting of single or bundled optical fibers in a panel of material, either through manual or automatic manipulation of an inserting apparatus, to accomplish the manufacture of sequential motion illustrations is now required.

It is, therefore, an object of the present invention to provide an apparatus for the implanting of a plurality of optical fibers in a pre-determined pattern in a fabric panel or panel of similar material having a substantially uniform planar surface for creating and illuminating a sequential motion pattern. It is also an object of the present invention to provide an apparatus for the implanting of a plurality of optical fibers in the fabric panel either manually or automatically and to combine individual optical fibers in ordered bundles as desired.

It is a further object of the present invention to provide a manual sighting device for positioning the insertion tool to implant the optical fibers at a pre-determined position in the fabric panel. It is another object of the present invention to provide an automated control for positioning the insertion tool to implant the optical fibers at one or more pre-determined positions in the panel.

It is yet still another object of the present invention to secure the optical fiber, once inserted through the panel, to the surface of the panel by means of applying an adhesive to the outer surfaces of the optical fiber, drawing the fiber against the surface of the panel, and curing the adhesive by exposure to ultraviolet light to affix the optical fiber in the pre-determined position at the surface of the fabric panel.

It is also an additional object of the present invention to secure individual optical fibers as each is inserted through the panel, to the opposing surfaces of the panel by means of applying an adhesive to surfaces and curing the adhesive, by exposure to ultraviolet light or otherwise, to affix the individual optical fiber in the pre-determined posi5ion at the surface of the panel.

Other objects will appear hereinafter.

SUMMARY OF THE INVENTION

An apparatus is described for implanting one or more optical fibers in a panel having a uniform planar surface. The apparatus is comprised of a frame for supporting a fiber insertion means above a fiber insertion table above a means for adhering the optical fiber to the panel. The means for adhering the optical fiber to the panel includes a bath containing ultra-violet light activated liquid adhesive and a source of ultra-violet light. The panel is interposed between the fiber insertion means and the fiber insertion table. The fiber insertion means includes an optical fiber feeder mechanism for feeding optical fibers to an implant head which carries the optical fiber downward to the fiber insertion table. The implant head pierces the panel at a desired point of insertion carrying the optical fiber to the underside of the panel through an opening in the insertion table for immersion into and removal from a liquid adhesive in the bath and subsequent irradiation by ultra-violet light from a source of ultra-violet light. The exposure to ultra-violet light causes a change of state of the adhesive from liquid to solid resulting in the permanent adherence of the adhesive created optical fiber to the panel at the point of insertion.

The implant head of the fiber insertion means also includes a fiber gripping means carried within the implant head for gripping and releasing said optical fiber and an insertion tool having a central hollow through which the optical fiber passes. The insertion tool has a beveled distal end to facilitate piercing and insertion of the optical fiber into the panel. The optical fiber feeding mechanism for feeding optical fiber is comprised of a fiber feed motor for playing out and taking up optical fiber contained on a fiber feed reel.

The bath portion of the means for adhering the optical fiber to the panel also includes an upwardly facing frusto-conical portion having a centrally disposed opening coaxially aligned with the implant head means of the fiber insertion means for receiving the tip of the optical fiber for immersion in the liquid adhesive contained therein. The bath also includes a means for recirculating the liquid adhesive from a reservoir into and upwardly through a chamber to exit through the upwardly facing frusto-conical portion to provide a constant level of liquid adhesive in the centrally disposed opening for immersion of the optical fiber to a depth measured from the tip along the optical fiber a pre-determined distance. The depth to which the optical fiber is immersed in said liquid adhesive ranges between ⅛ to ⅜ inches.

The means for adhering the optical fiber to the panel also includes a shutter means for shielding the ultra-violet light activated liquid adhesive in the bath from exposure to the source of ultra-violet light to prevent causing a change of state of the adhesive from liquid to solid. The source of ultra-violet light is activated to cause the change of state of the adhesive from liquid to solid with a nominal exposure in the range of 5 to 15 $\mu$secs. and a light intensity in the range of 7,500 to 15,000 milliwatts. The source of ultra-violet light is positioned below the fiber insertion table with the emanating beam of ultra-violet light focused toward the tip of the adhesive coated optical fiber extending through to the underside of the panel and into the opening in the fiber insertion table. The irradiation of the tip of the adhesive coated optical fiber subsequent to immersion in the liquid adhesive by ultra-violet light from the source of ultra-violet light causing a change of state of said adhesive from liquid to solid results in the formation of a bead of solid adhesive at the tip of the optical fiber extending onto the panel at the point of insertion, the bead being substantially transparent to light.

Additionally, the means for adhering the optical fiber to the panel includes an adhesive being applied to the upper surface of the panel adjacent to the fiber insertion means by application through a tube or conduit configured to apply only a pre-determined amount of adhesive immediately adjacent to the optical fiber forming a bead surrounding the optical fiber. Irradiation of the bead of liquid adhesive formed surrounding the optical fiber by ultra-violet light from a second surface of ultra-violet light causes, as before, a change in state of the adhesive from liquid to solid with the now solid bead of adhesive surrounding the optical fiber and extending onto the surface of the panel at the point of insertion. Alternatively, the adhesive may be of differing chemical compositions having a variety of setting or fixative mechanisms which may be selected from the group of epoxies, silicones, acrylics or other plastic adhesives, hot-melt or contact adhesives, applied in a liquid state and cured at the site of adherence.

The fiber insertion means also includes a means for illuminating the point of insertion of the optical fiber into the panel to align the panel and the point of insertion with the implant head means. The means for illuminating the point of insertion is positioned above the fiber insertion table and aligned to illuminate a point directly beneath the implant head means.

The frame means of the optical fiber insertion apparatus is moveable in a horizontal plane to align the fiber insertion means directly over the point of insertion in the panel, the panel being supported in a carrier and remaining stationary. Alternatively, the carrier supporting the panel is moveable in a horizontal plane to align the fiber insertion means directly over the point of insertion in the panel, the frame means of the optical fiber insertion apparatus remaining stationary.

The method for implanting one or more optical fibers in a panel having a uniform planar surface is comprised of the steps of providing a frame for supporting a fiber insertion means above a fiber insertion table, interposing a panel between the fiber insertion means and the fiber insertion table, positioning a means for adhering the optical fiber to said panel below the fiber insertion table, the means for adhering including a bath containing ultra-violet light activated liquid adhesive, a shutter means and a source of ultra-violet light, feeding optical fiber to the fiber insertion means which carries said optical fiber to the fiber insertion table, piercing the panel at a desired point of insertion and carrying the optical fiber to the underside of the panel through an opening in the insertion table for immersion into the liquid adhesive in the bath, removing the optical fiber from immersion in the bath of liquid adhesive and carrying the optical fiber to the underside of the panel so that only the tip of the optical fiber extends through the panel, closing the shutter means and irradiating the tip of the optical fiber with ultra-violet light from the source of ultra-violet light, exposure to the ultra-violet light causing a change of state of the adhesive from liquid to solid resulting in the formation of a bead of solid adhesive at the tip of the optical fiber and extending onto the panel permanently adhering the optical fiber to the panel at the point of insertion.

The method is further comprised of the step of illuminating the point of insertion of the optical fiber into the panel to align the panel and the point of insertion with the fiber insertion means. The method also is comprised of the step of moving the frame in a horizontal plane to align the fiber insertion means directly over the point of insertion of the optical fiber into the panel, the panel being supported in a carrier and remaining stationary. Alternatively, the method may include the step of supporting the panel in a carrier and moving the carrier in a horizontal plane to align the fiber insertion means directly over the point of insertion of the optical fiber into the panel with the frame means remaining stationary.

A description of the method for implanting one or more optical fibers in a panel having a uniform planar surface with greater particularity includes the steps of providing a frame for supporting a fiber insertion means above a fiber insertion table, interposing a panel between the fiber insertion means and the fiber insertion table, positioning a means for adhering the optical fiber to the panel below the fiber insertion table, the means for adhering including a bath containing ultra-violet light activated liquid adhesive, a shutter means and a source of ultra-violet light, feeding a first measured length of optical fiber to the fiber insertion means which grips and carries the optical fiber to a position immediately above the fiber insertion table, piercing the panel at a desired point of insertion and carrying the optical fiber to the underside of the panel through an opening in the insertion table, feeding a second measured length of optical fiber through the fiber insertion means and immersing the tip of the optical fiber into the liquid adhesive in said bath, removing the optical fiber from immersion in the bath of the liquid adhesive and carrying the optical fiber to the underside of the panel so that only the tip of the optical fiber extends through the panel, closing the shutter means over the bath of the liquid adhesive to prevent solidification from exposure to ultra-violet light, irradiating the tip of the optical fiber extending through the panel with ultra-violet light from the source of ultra-violet light, exposure to the ultra-violet light causing a change of state of the adhesive from liquid to solid resulting in the formation of a bead of solid adhesive at the tip of the optical fiber and extending onto the panel permanently adhering the optical fiber to the panel at the point of insertion, releasing the optical fiber now adhered to the panel and retracting the fiber insertion means, and severing the optical fiber at a point immediate the tip of the retracted fiber insertion means resulting in a desired length of optical fiber adhered to the panel at the point of insertion.

The method is further comprised of the step of illuminating the point of insertion of the optical fiber into the panel to align the panel and the point of insertion with the fiber insertion means. The method is also comprised of the step of moving the frame in a horizontal plane to align the fiber insertion means directly over the point of insertion of the optical fiber into the panel, the panel being supported in a carrier and remaining stationary. Alternatively, the method includes the step of supporting the panel in a carrier and moving the carrier in a horizontal plane to align the fiber insertion means directly over the point of insertion of the optical fiber into the panel with the frame means remaining stationary.

The described method, in the steps of feeding first and second lengths of the optical fiber, also includes controlling a fiber feed motor for playing out and taking up optical fiber contained on a fiber feed reel. In the step of immersing the tip of the optical fiber into the liquid adhesive in the bath, the method includes coaxially aligning a centrally disposed opening in the bath with the fiber insertion means for receiving the tip of the optical fiber and providing the centrally disposed opening with a constant level of liquid adhesive for immersion of the optical fiber to a depth measured from the tip along the optical fiber a pre-determined distance. The method also includes, in the step of irradiating the tip of said optical fiber, exposing the tip of the optical fiber after immersion in the liquid adhesive in the range of 5 to 15 $\mu$secs. and a light intensity in the range of 7,500 to 15,000 milliwatts.

Both of the described methods additionally include the steps of adhering the optical fiber to the upper surface of the panel adjacent to the fiber insertion means by applying an adhesive of a pre-determined amount immediately adjacent to the optical fiber forming a bead surrounding the optical fiber and curing the adhesive so as to cause a change in state of the adhesive from liquid to solid with the now solid bead of adhesive surrounding the optical fiber and extending onto the surface of the panel at the point of insertion. The step of curing the adhesive the method includes irradiating the bead of liquid adhesive formed surrounding the optical fiber by ultra-violet light from a second source of ultra-violet light causing a change in the state of the adhesive from liquid to solid.

Alternatively, the liquid adhesive applied to the upper surface of the panel adjacent the fiber insertion means may be selected from the group of epoxies, silicones, acrylics or other plastic adhesives, hot-melt or contact adhesives, applied in a liquid state and cured at the site of adherence.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
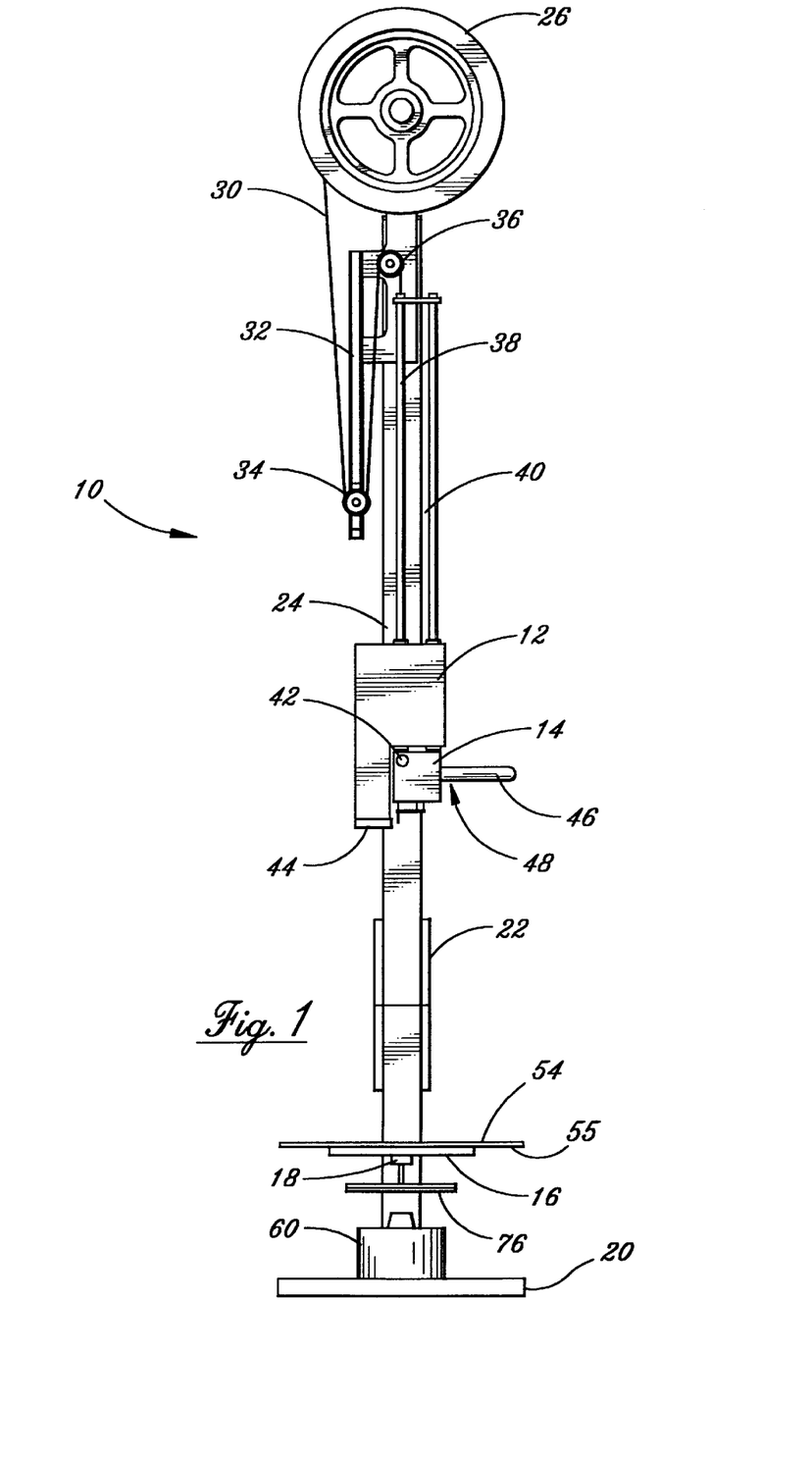
FIG. 1 is a front plan view of the optical fiber insertion apparatus of the present invention with the insertion head in the raised position.
Figure 2:
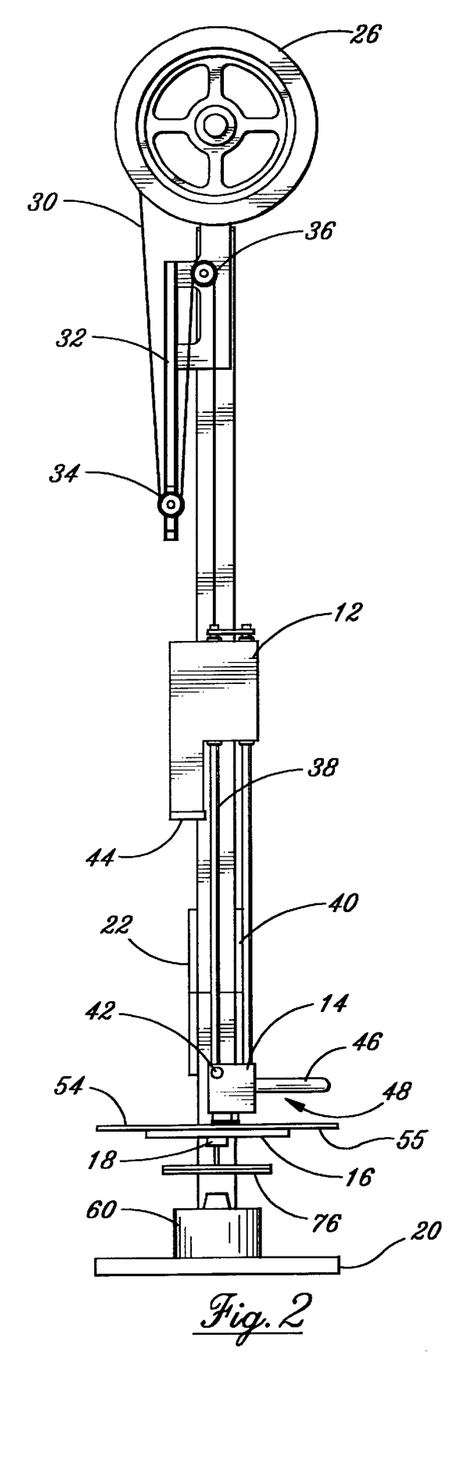
FIG. 2 is a front plan view of the optical fiber insertion apparatus of the present invention with the insertion head in the lowered position against the fabric panel supporting platform.

Referring now to the drawings in detail, where like numerals refer to like parts or elements, there is shown an optical fiber implanting apparatus 10. The optical fiber implanting apparatus 10 is comprised of a bearing block and head mount assembly 12, an implant head 14, a fiber insertion table 16, a table support 18, a base 20 and a frame 22. The frame 22 supports a vertically extending guide arm 24 which arm supports the bearing block and head assembly 12 and the fiber reel 26 and fiber feed motor 28. The guide arm 24 extends vertically upward from the base 20 and frame 22 supporting the bearing block and head mount assembly 12 at a fixed distance above the fiber insertion table 16. At the uppermost extent of the guide arm 24, the fiber feed reel 26 and fiber feed motor 28 are mounted so that the optical fiber 30 can be played out from the reel 26 through a fiber feed system 32 including feed and take-up pulleys 34, 36 which provide sufficient tension to play out and hold taut the fiber 30 between the fiber feed reel 26 and the bearing block and head mount assembly 12 upon appropriate command from manual or automatic controls.

Extending downward from the bearing block and head mount assembly 12 are parallel motion control arms 38, 40, which may also be referred to as elongated cylindrical bearing shafts, for supporting the implant head 14 and controlling the positioning of the implant head 14 as it extends downward from the head mount assembly 12. The fiber 30 is maintained in position within the implant head 14 by a fiber gripping cam 42 which is eccentric in shape and rotated into and out of contact with the fiber 30 within the implant head 14 in an operational manner known in the art to clamp or retain an object in a desired position. Also contained within the head mount assembly 12 is a knife or cutting head 44 which is used to sever the optical fiber 30 as explained more fully below.

When manual operation of the optical fiber implant apparatus 10 is utilized, a handle 46 is used to move the implant head 14 up and down through the bearing block and head mount assembly 12 on the control arms 38, 40. Associated with the handle 46, is a trigger 48 which controls the knife 44 and the gripping cam 42 as will be described more fully below.

Figure 3:
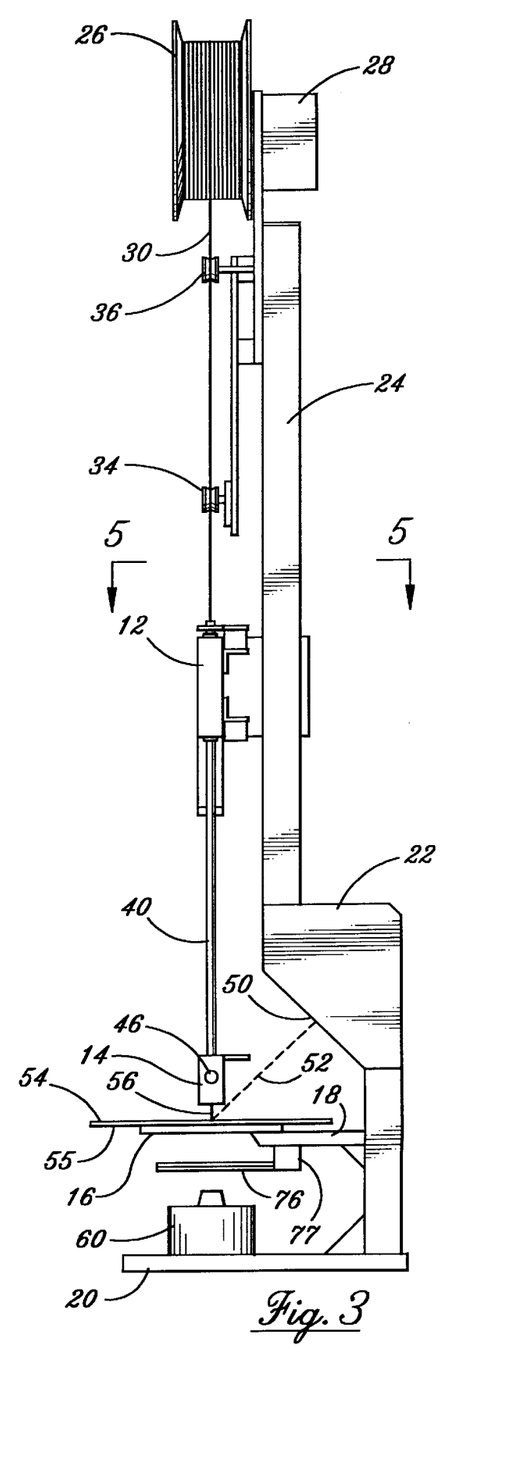
FIG. 3 is a side view of the optical fiber insertion apparatus of the present invention with the insertion head lowered against the supporting platform showing an illuminated aiming device for positioning the insertion tool at a pre-determined mapped location on the fabric panel.

Contained within the frame 22 is a head positioning means 50 which includes a source of illumination (not shown) which creates a focused lightbeam 52 which illuminates a pre-marked position on the fabric panel 54 by creating a shaped illumination point which correlates with the point of insertion of the implant head 14 through the fabric panel 54 at the pre-marked point.

The operation of the fiber implanting apparatus 10 from its rest position, as shown in FIG. 1, is for the fiber gripping cam 42 to be engaged by depression of the trigger 48 in handle 46 of the implant head 14. The depression of the trigger 48 actuates the knife or cutting head 44 and severs, by cutting away, excess optical fiber 30 beyond a pre-measured length of said fiber extending beyond the insertion tool 56 of the implant head 14.

The insertion tool 56 is a needle-like rigid tool with a hollowed-out central core for the fiber 30 to pass through and a sharpened (beveled) distal end to penetrate the panel 54 contained within a carrier or frame 55.

The sequenced action of the fiber implanting apparatus 10, once the gripping and cutting of the optical fiber 30 is completed, is to feed additional optical fiber 30 from the feed reel 26 through the fiber feed system 32 which length of fiber permits the implant 14 to be moved downward through the head mount assembly 12 in vertical alignment as permitted by the control arms 38, 40 until the insertion tool 56 comes into contact with the fabric panel 54. The pre-measured length of the optical fiber 30 which is permitted to be unwound from the feed reel 26 by the feed motor 28 permits the implant head 14 to travel downward on the control arms 38, 40 the exact length which is desired for use of the optical fiber to illuminate a patterned array when the insertion and adhesion to the material of panel 54 is completed.

Figure 4:
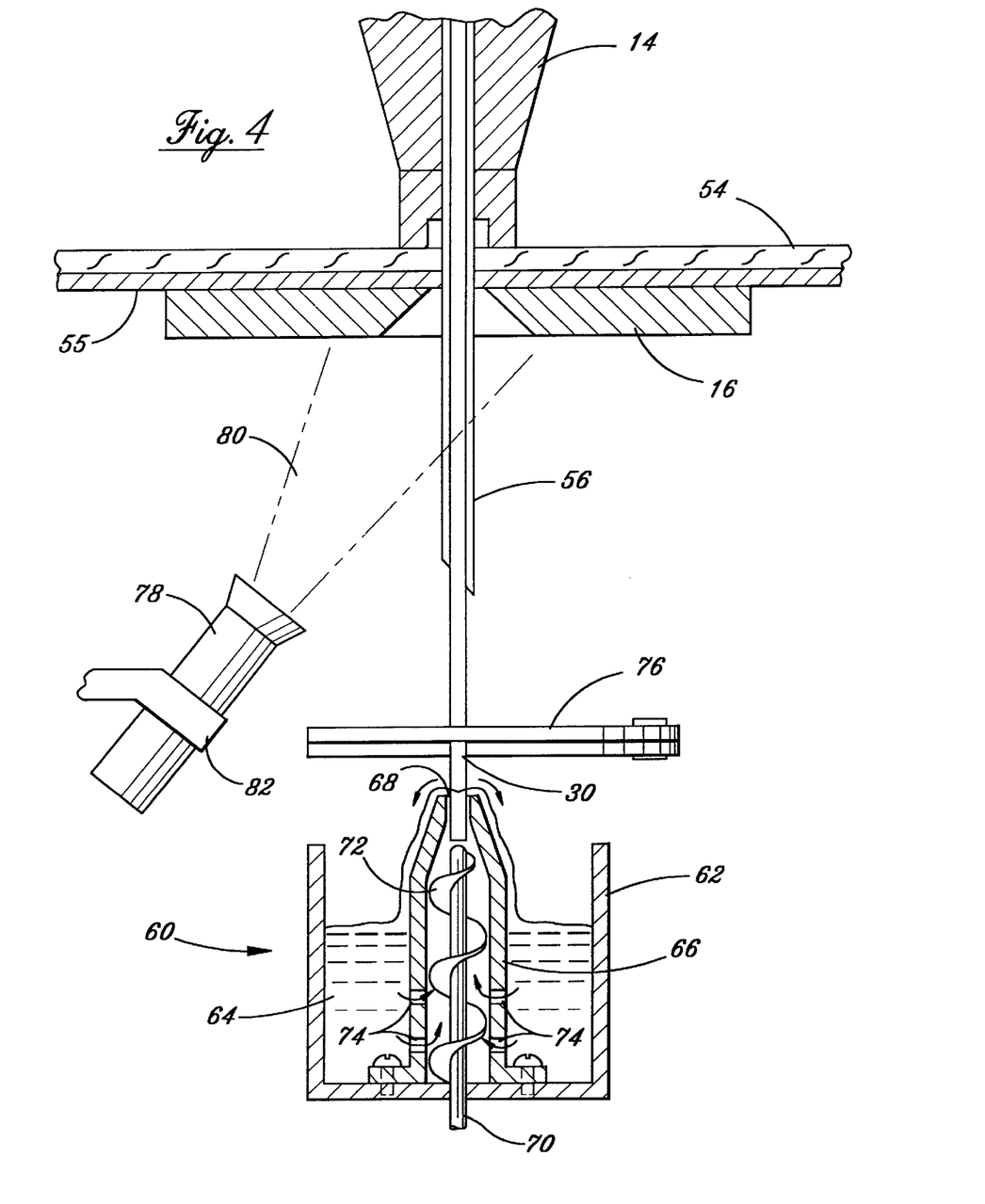
FIG. 4 is an enlarged view of the insertion head and insertion table showing an optical fiber extending downward through the insertion tool toward a partially broken away front view of a reservoir of liquid adhesive, a shutter means, and an ultra-violet curing lamp for attaching the optical fiber to a fabric panel.

For manual operation, the handle 46 is utilized to push the insertion tool 56 through the fabric panel 54 at the point indicated by the lightbeam 52 of the head positioning means 50. The fiber gripping cam 42 is disengaged permitting the feed motor 28 to play out an additional or second measured length of optical fiber 30 from the feed reel 26 before the gripping cam 42 re-engages so that the second measured length of optical fiber 30 extends downward from the insertion tool 56 which has penetrated the fabric panel 54. The insertion tool 56 and optical fiber 30 extend downward through an opening 58 in the table 16 as shown in FIG. 4. The implant head 14, in this position, physically contacts the material of panel 54 to retain the panel in position during the following actions.

Once the insertion tool 56 and optical fiber 30 are extended through the fabric panel 54 the pre-measured distance, the optical fiber 30 comes into contact with and its tip is immersed in a liquid adhesive bath 60. The bath 60 includes a reservoir 62 for containing the liquid adhesive 64 which is used to affix the optical fiber 30 to the downward facing side of the fabric panel 54 in a manner to be explained.

The optical fiber 30 is inserted into a frusto-conical portion of a centrally positioned fountain-like extension 66 of the reservoir 62 having an opening 68 axially aligned with the insertion tool 56. The liquid adhesive 64 cascades upward, outward and down the external sides of the extension 66 and continues in this motion by means of an auger-like shaft 70 having helical vanes 72 powered by a motive force (not shown) which causes the rotation of the shaft 70. As shaft 70 rotates the liquid adhesive 64 is recirculated throughout the reservoir by causing the liquid adhesive 64 to exit the axially aligned opening 68 at the top of the extension 66, cascade down the outer sides of the extension 66 and into the reservoir 62 continuing through a series of apertures 74 where the helical vanes 72 of the shaft 70 cause the adhesive liquid to rise within the extension 66 and again exit the opening 68. In this manner the liquid adhesive continues to be maintained at a constant liquid depth within the opening 68 so the tip of the optical fiber 30 can be immersed into the liquid adhesive 64 to a pre-determined depth in the range of ⅛ to ⅜ inches.

Liquid adhesive 64 is presently preferred to be an acrylic resin which hardens (changes state from liquid to solid) upon exposure to ultra-violet light. One such optical adhesive is manufactured by Norland Products of New Brunswick, N.J. and may be identified as NOA 1060(70). Nominal exposure for hardening is approximately 10 $\mu$secs. with a light intensity in the range of 12,000 milliwatts. Other optical adhesives having the properties described above can be used with light exposure times within the range of 5 to 15 $\mu$secs. and light intensities in the range of 7,500 to 15,000 milliwatts.

Once the tip of the optical fiber 30 is immersed in the liquid adhesive 64 for a sufficient time so that the tip and a pre-determined length of the fiber 30 are coated with the adhesive 64, the fiber 30 is extracted vertically a third measured distance so that its bottom-most end (the tip) extends to a point just below the underside of the fabric panel 54. At this point in the insertion process, a shutter 76 (which may be a rotating panel or constricting "eye") is interposed between the reservoir 62 and the area to be irradiated, the bottom-most end (the tip) of the fiber 30. The shutter 76 may be mounted to the support 18 by mounting arm 77. The shutter 76 blocks both direct and reflected light from entering the reservoir 60 from a source of ultra-violet light 78. The ultra-violet lamp 78 is held in an appropriate upward angled position ranging between 45° and 60° to the path of travel of the insertion tool 56 by clamp 82 to reduce direct or reflective spill of the ultraviolet light into the reservoir 62.

The ultra-violet lamp 78 is angled upwards towards the conical opening 58 in the bottom of the insertion table 16 in which the bottom-most end of the optical fiber 30, covered with the adhesive liquid 64, is positioned against the underside of the material of panel 54. The exposure of the adhesive liquid 64 to the ultra-violet illumination (beam 80) substantially and instantaneously cures the adhesive liquid 64 coating the fiber 30 turning the liquid into a solid and fixedly securing the optical fiber 30 to the fabric panel 54 at the insertion point.

Figure 7:
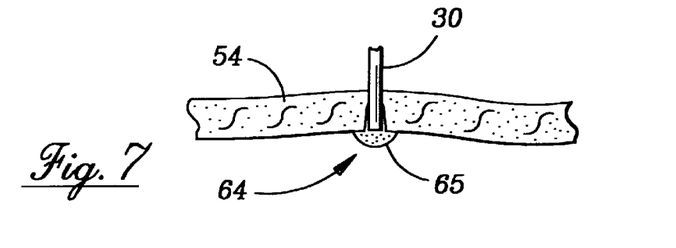
FIG. 7 is an enlarged view of an optical fiber affixed to a fabric panel showing the adhesive joining the optical fiber to the panel after exposure to the ultra-violet curing lamp.

With reference to FIG. 7, the retracted optical fiber 30 is shown affixed to the fabric panel 54 by the cured adhesive 64. The adhesive 64 remains against the outer surface of the fiber 30 and is wiped partially away from the immersed surface of the fiber 30 and towards the tip as the fiber is pulled upward through the panel 54. As the fiber 30 is pulled through the panel 54 the adhesive 64 forms an attached bead 65 along the underside of the fabric panel 54 adjacent the tip of fiber 30. The bead 65 of adhesive 64 is formed in a generally hemispherical shape and exhibits a substantial transparency to all wavelengths of light.

Figure 8:
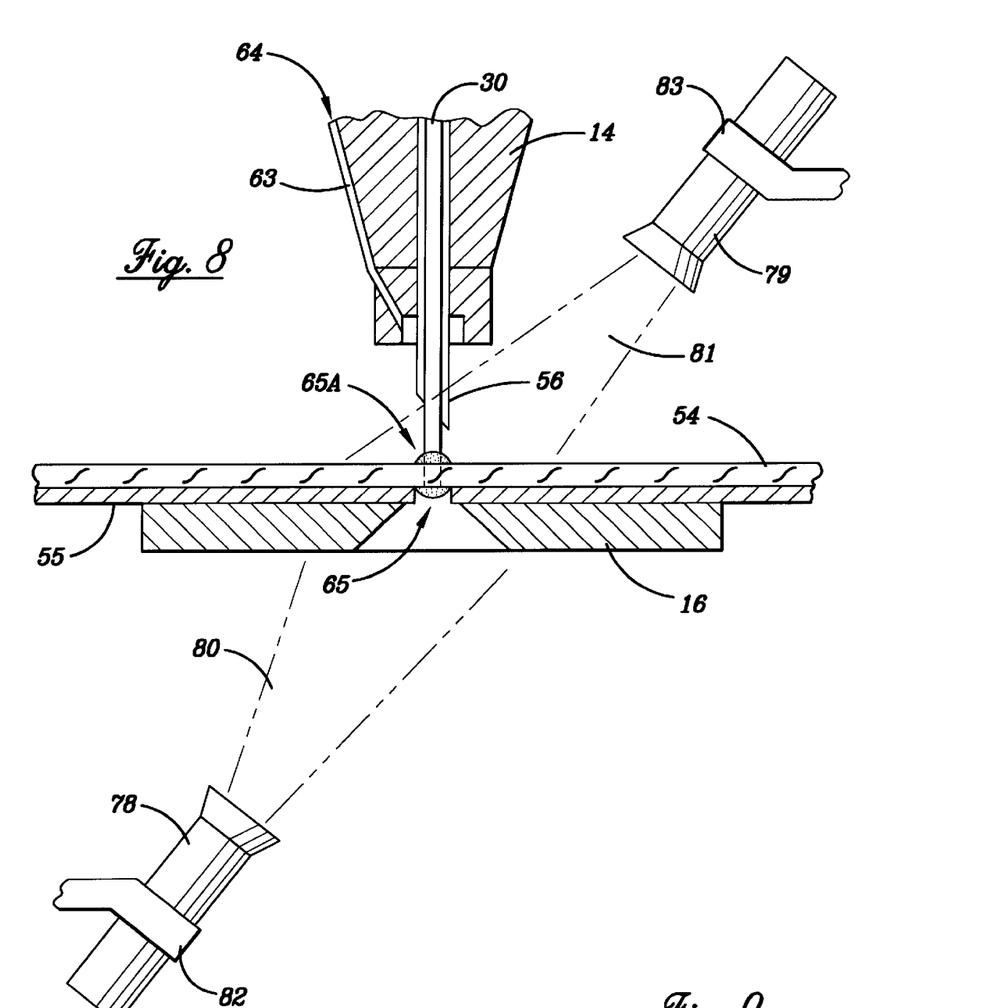
FIG. 8 is an enlarged view of the insertion bead and insertion table showing an optical fiber extending through a panel to which adhesive has been applied on both sides of the panel and ultra-violet curing lamps for attaching the optical fiber to both sides of the panel.

Referring now to FIG. 8, there is shown an optical fiber 30 positioned against and through the fabric panel 54 and held in place by a bead 65 of adhesive 64 formed in a generally hemispherical shape to the bottom side of the panel as described above. The bead 65 of adhesive 64 is shown being cured by exposure to beam 80 of ultra-violet light from lamp 78, also as described above. Simultaneously, with this action, and with the implant head 14 remaining in contact with the panel, a second pre-determined amount of an adhesive 64 is placed in proximity to the optical fiber 30 extending upward from the panel 54 such that such adhesive 64 surrounds the optical fiber 30 at its juncture with the panel 54. The adhesive 64 may be placed in the intended position surrounding the optical fiber 30 by any suitable means which will circumferentially surround the optical fiber 30 and contact the panel 54. As shown in FIG. 8, a conduit 63 extending down the outside surface of the implant head 14 provides the measured amount of adhesive which is intended to circumferentially surround the optical fiber 30 and contact the panel 54. Once the measured amount of adhesive has been appropriately deposited around the optical fiber 30, the implant head 14 is lifted so that a second source of ultra-violet light 79 is permitted to focus a beam 81 of ultra-violet light across the area surrounding the deposited measured amount of adhesive 64 so that the liquid adhesive can change state and become a solid bead 65A of adhesive curing the liquid into a solid and fixedly securing the optical fiber 30 to the panel 54 at the upwardly facing intersection point. The lamp 79 is held in position by an arm or clamp 83 which permits the adjustment of the lightbeam 81 so that the focus completely encompasses the intended area surrounding the deposited measured amount of adhesive 64.

This additional step of placing adhesive on the reverse side of the fabric panel 54 (which is the upward facing side of the panel 54 as shown in FIG. 8), is accomplished either in combination with the application of adhesive to the outer surface (or downward facing side) of the fabric panel 54, as described above, or without affixing adhesive to the outer surface of the panel 54. Thus, the optical fiber 30 may be secured to the fabric panel 54 on the outer surface (downward facing side), the inner surface (upward facing side), or both the outer and inner surfaces (upward and downward facing sides) of the fabric panel 54. Additionally, the adhesives used may be applied in a liquid or semi-solid state and then a curing mechanism is applied so that the adhesive takes on solid form. The adhesive types, in addition to the optical adhesive already described above, may be selected from the group of adhesives which may be described as two-part epoxies, silicones, acrylics, and other plastic adhesives which are manufactured by 3M Companies, Dow Corning, Loctite, and others, as well as hot-melt and contact adhesives, all of which are intended to be applied in a liquid or semi-solid state and cured at the site of adherence.

The curing mechanism may be in chemical form or may be in the form of a chemical reaction triggered by exposure to certain wavelengths of light. Additionally, the mechanism for curing may also be the application of heat to the adhesive 64 which has an additional benefit if the heat energy does not alter to transmission characteristics of the optical fiber 30. A heat gun or other suitable device giving off controlled amount of heat energy may be used to apply heat to cure the liquid or semi-solid adhesive 64 to the optical fiber 30 and to the fabric panel 54. The temperature of the heat energy is desired to be in the range of 200° F.–350° F. and preferably approximately 275° F. The heat energy should not be greater than the stated range for the reason that the transmission characteristics of the optical fiber 30 will be altered by melting if the temperature of the optical fiber 30 exceeds approximately 160° F. If done properly, the application of heat to the underside of the fabric panel 54 will alter the optical fiber 30 by improving the clarity of the tip (or lens) such that the adhesive 64 and optical fiber 30 virtually merge so that there is little or no loss in light transmission emanating from the optical fiber 30.

Figure 9:
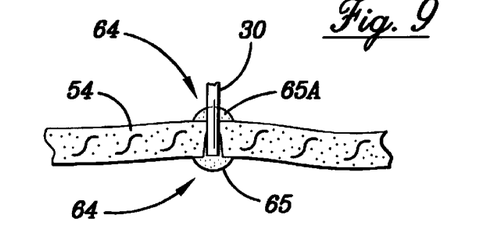
FIG. 9 is an enlarged view of an optical fiber affixed to a panel showing adhesive beads joining the optical fiber to the panel on both sides of the panel after curing.

As can be seen with reference to FIG. 9, the optical fiber 30 is now fixedly secured to the fabric panel 54 on both the outer (downward facing) surface and inner (upward facing) surface by adhesive beads 65, 65A, respectively. The measured amount of adhesive 64 forms a generally hemispheric bead 65, 65A which circumferentially surrounds the optical fiber 30 on the inner surface of panel 54 and overlies the tip of the optical fiber as it has been inserted through to the outer facing surface of the panel 54 in similar fashion to that described in connection with FIG. 7 above.

After the applied adhesive has been transformed to a solid state and securing fastening the optical fiber 30 to the panel 54, the implant head 14 may either be returned to contact the panel 54 or raised to its rest point with the appropriate release and regripping of the optical fiber by the gripping cam 42 which is described in more detail below.

Returning to an explanation of the sequenced action of the fiber insertion apparatus 10, the material of panel 54 is released as the implant head 14 is raised to its rest point after the gripping cam 42 is also released permitting the optical fiber 30, which is now attached to the panel 54 by adhesive 64, to extend downward from the implant head 14 and insertion tool 56 a fourth measured length, the length being the distance to the insertion table 16 from the position of the knife 44 in the head mount assembly 12. When fully extended, the fiber 30 will be cut by the knife 44 at the distal end of the insertion tool 56 as the implant head 14 returns to its rest position. The now free optical fiber 30 can be gathered into a bundle or be kept segregated as may be desired to complete the connection to one or more sources of illumination for the desired display of the completed patterned array on the fabric panel.

Figure 5:
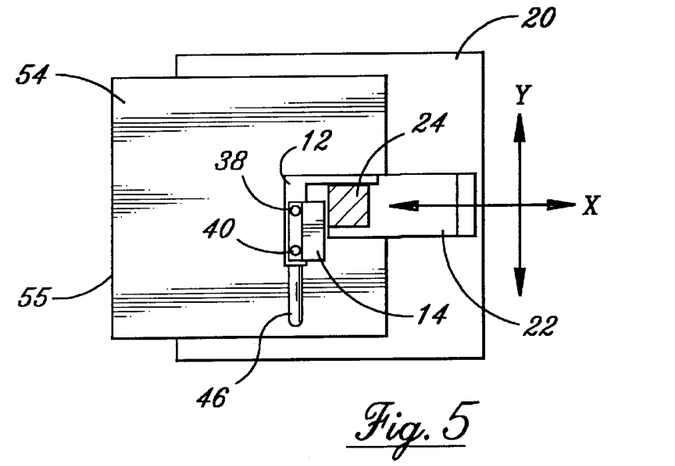
FIG. 5 is a sectional view taken along Line 5—5 of FIG. 3 which exemplifies the X-Y planar motion, which may be manually or automatically controlled, to the optical fiber insertion apparatus of the present invention.

It is desirable to be able to move in both X and Y directions in a single plane in order to position the implant head 14 over the pre-determined and marked insertion point in the panel 54. Thus, as shown in FIG. 5, base 20 and frame 22 are indicated as having the capability of moving in an X direction (forward over the fabric panel 54) or in the Y direction (laterally parallel to the nearest edge of the fabric panel 54) in order for the insertion tool 56 to directly overlie the desired insertion point as marked on the panel 54. Such motion can be accomplished manually by grasping the frame 22 and handle 46 to position the implant head 14 in the desired position indicated by the lightbeam 52 of the positioning means 50 so that the implant head 14 (as well as insertion tool 56) directly overlies the insertion point for the optical fiber 30 in the fabric panel 54 within carrier 55 which remains stationary, although the insertion table 16 moves with the frame 22. Alternatively, it is possible to move the fabric panel 54 within carrier 55 over top of the insertion table 16 in a similar X-Y plane, again utilizing the lightbeam 52 to properly position the implant head 14 over the desired insertion point.

Figure 6:
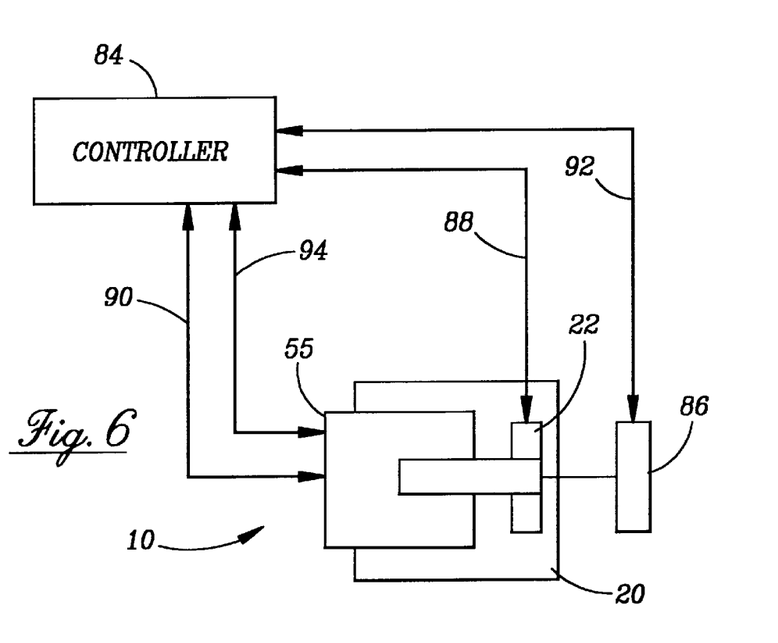
FIG. 6 is a block diagram of a computer assisted controller for automatically positioning the insertion head and insertion table of the optical fiber insertion apparatus in a plurality of pre-determined positions for inserting and adhering optical fibers to the fabric panel in a pre-determined patterned array.

The just described manual positioning of the base 20 and frame 22 or the fabric panel 54 in carrier 55 may be utilized with a controller 84 which controls the sequence of operation of the optical fiber implant apparatus 10 using bi-directional data and signal lines as shown in FIG. 6. The controller 84 provides signal and data information for operational sequence to the optical fiber implant apparatus 10 over communication lines 88, 90. Communication line 88 may be utilized to control the operations within the upper segment of the optical fiber implant apparatus 10 by controlling operations within the bearing block and head mount assembly 12 and in the fiber feed system 32. Communication line 90 may be utilized to provide control of the sequence of operations of the elements below the fiber insertion table 16, the reservoir 62, shutter 76 and ultra-violet lamp 78.

Of course, overall operational control remains within the controller 84 to properly sequence all of the actions of the optical fiber implant apparatus 10. Each of the communication lines 88, 90 are bi-directional and, as such, will accept status signals from operational elements of the implant apparatus 10 so that the controller 84 can effectively ascertain the instantaneous status of each operation of each element, and the sequence of such operation, as the operations actually occur. Further, communication lines 88, 90 can transmit data for operating individual elements of the implant apparatus 10.

If it is desired to have fully automatic operation, in the sense of program control of the optical fiber implant apparatus 10, additional communication lines may be utilized to control the X-Y directional motion of the base 20 and frame 22 by communication line 92, or the X-Y directional motion of the carrier 55 by the communication line 94. As in the case of the other communication lines 88, 90, communication lines 92, 94 are bidirectional and provide control signals for motion from the controller 84 to the optical fiber implant apparatus and receive signals indicating to the controller 84 the exact response by the movable elements of the implant apparatus 10 as well as transmit data for specific operations to be accomplished.

In the fully automatic operation, the controller 84 may be a special purpose computer having appropriate application software program control for sequentially operating the optical fiber implant apparatus 10. The controller 84 is capable of providing commands to the X-Y motion control 86 which is translated into linear distances for moving either the base 20 and frame 22 or the carrier 55 by any appropriate means, such as stepper motors or hydraulic or pneumatic pistons which have extendable arms for controlling the lateral motion of the base 20 and frame 22 or the carrier 55. Appropriate sensors (not shown) can be utilized to monitor the X and Y directional movement for aligning the implant head 14 at the illuminated insertion point on the panel 54. Commands for similar X-Y directional motion can also be imparted directly to the carrier 55 in like fashion using a similar X-Y motion controller as that motion controller 86. Thus, the optical fiber implant apparatus 10 is susceptible to either manual, semi-automatic or fully automatic operation.

The sequential operation of the optical fiber implant apparatus 10, whether manual, semi-automatic or fully automatic, can be described as follows. The implant apparatus 10 has an optical fiber 30 fed from the fiber feed reel 26 through the fiber feed system 32 and into the implant head 14. The fiber 30 is fed through the central hollow of the insertion tool 56 so that it extends just slightly beyond the tip of the insertion tool 56. This initial threading of the implant apparatus 10 is concluded by the activation of the fiber gripping cam 42 which clamps the fiber 30 in position for the knife 44 to cut off any excess fiber 30 beyond the tip of the insertion tool 56. The operational sequence of steps is as follows.

With the optical fiber 30 clamped in position within the implant head 14 by the fiber gripping cam 42, the implant head 14 is permitted to begin its downward motion by either releasing a brake (not shown) on the motion control arms 38, 40 or commanding the fiber feed motor 28 to play out a first measured length of optical fiber 30 from the fiber feed reel 26 through the fiber feed system 32. This first measured length of optical fiber 30 permits the implant head 14 to move downward on the motion control arms 38, 40 through the bearing block and head mount assembly 12 so that the insertion tool 56 is positioned directly above the pre-determined and marked point of insertion, as indicated by the lightbeam 52 from the head positioning means 50 located within the frame 22.

If the implant apparatus is being manually controlled, either the panel 54 in carrier 55 or the frame 22 (along with base 20 and insertion table 16) can be moved in the desired X-Y directions to align the lightbeam 52 with the insertion point markings on the material of panel 54. If the panel 54 is to be moved to position marked insertion points below the insertion tool 56 of the implant head 14, the carrier 55 upon which the panel 54 rests may be moved in an X-Y direction and the insertion apparatus 10 would remain stationary. If the base 20 and frame 22 are to be moved, which will, in turn, cause the identical movement of the vertical guide arm 24 and all elements mounted to it including the bearing block and head assembly 12 and the insertion table 16 and bath 60 to retain the alignment of these elements, then the panel 54 and carrier 55 remain stationary.

Once properly positioned with the marked insertion point directly underlying the insertion tool 56 of the implant head 14, insertion through the material of the panel 54 is accomplished by manually pushing the insertion tool 56 through the material of the panel 54 utilizing the handle 46 so that the beveled tip of the implant head 14 contacts and penetrates the material of panel 54. The insertion tool 56 having penetrated the material of panel 54 at the marked insertion point now extends through the insertion table 16 and through the conical opening 58.

When this sequence of operations is completed, a command is given to the fiber feed motor 28 to play out a second measured length of optical fiber 30, this length substantially being the distance between the tip of the insertion tool 56 and the liquid adhesive bath 60 so that the tip of the optical fiber 30 can be immersed a pre-measured distance into the opening 68 at the top of the fountain-like extension 66 of the bath 60. The gripping cam 42 is moved out of contact with the fiber 30 to permit the measured length to play out through the insertion tool 56. The tip of the optical fiber 30 extends out of the tip of the insertion tool 56 and into the recirculated liquid adhesive 64 of the bath 60. The tip of the fiber 30 is immersed in the liquid adhesive 64 a sufficient time for the adhesive 64 to coat the exterior of the tip of the fiber 30, as well as a short distance along the fiber 30 approximately 0.25 to 0.375 inches.

When the measured time period has elapsed, and if the implant apparatus is being manually operated, the insertion tool is withdrawn from the material of the panel 54 a third measured distance (without release of the gripping can 42) so that the tip of the optical fiber 30 coated with the liquid adhesive 64 remains extending through the material of the panel 54, physically positioned just below the underside of the material and within the conical opening 58. The shutter 76, which was previously open to accommodate passage of the tip of the optical fiber 30, is now closed tightly over the liquid adhesive bath 60 and the ultraviolet lamp 78 is energized creating the ultraviolet lightbeam 80 which impinges upon the liquid adhesive 64 coating the tip of the optical fiber 30. Exposure of the liquid adhesive 64 adhered to the tip and adjacent outer surface of the fiber 30 causes a change of state of the adhesive 64 from liquid to solid permanently affixing the tip of the optical fiber 30 to the material of panel 54 at the point of insertion. The ultraviolet lightbeam illuminates the tip and adjacent outer surfaces of the optical fiber 30 for a pre-determined time period and then is turned off after causing the change in state of the adhesive 64.

In the case of application of the adhesive in liquid or semi-solid form to the inner surface, the upper facing side, of the fabric panel 54, then steps similar to that described for curing the adhesive for the outer facing (underside) of the panel 54 will also take place by upwardly adjusting or raising the implant head 14 by releasing the gripping cam 42 so that the implant head 14 is raised a distance sufficient to irradiate the measured amount of liquid adhesive 64 surround the optical fiber 30 by beam 81 from ultra-violet lamp source 79 which is held in position by an arm or lamp 83 in a fashion similar to that for the lamp on the underside of the table 16. Exposure of the liquid or semi-solid adhesive 64 adhered circumferentially around the optical fiber 30 to the ultra-violet lightbeam 81 will cause a change of stated adhesive 64 from liquid or semi-solid to solid permanently affixing the optical fiber 30 to the material of panel 54 at the point of insertion through the panel. As in the case of the outer surface adherence of the tip of the optical fiber 30, the ultra-violet lightbeam 81 illuminates the area surrounding the bead 65A of adhesive 64 for a pre-determined time period and then is turned off after causing the change in state of the adhesive 64. Alternatively, other mechanisms for curing the selected adhesive material may be utilized other than ultra-violet curing so long as they have the same effect of producing a solid bead 65A of adhesive circumferentially surrounding the optical fiber 30 and adhering that fiber to the inner surface of the panel 54 such that the optical fiber 30 is permanently secured to the fabric panel 54.

Alternative curing mechanisms may be in chemical form or may be in the form of a chemical reaction triggered by exposure to certain wavelengths of light. Additionally, the mechanism for curing may also be the application of heat to the adhesive 64 which has an additional benefit if the heat energy does not alter to transmission characteristics of the optical fiber 30. A heat gun or other suitable device giving off controlled amount of heat energy may be used to apply heat to cure the liquid or semi-solid adhesive 64 to the optical fiber 30 and to the fabric panel 54. The temperature of the heat energy is desired to be in the range of 200° F.–350° F. and preferably approximately 275° F. The heat energy should not be greater than the stated range for the reason that the transmission characteristics of the optical fiber 30 will be altered by melting if the temperature of the optical fiber 30 exceeds approximately 160° F. If done properly, the application of heat to the underside of the fabric panel 54 will alter the optical fiber 30 by improving the clarity of the tip (or lens) such that the adhesive 64 and optical fiber 30 virtually merge so that there is little or no loss in light transmission emanating from the optical fiber 30.

In the event that either semi-automatic or fully automatic operation is desired, in order to achieve the pre-determined upward movement of the implant head 14, and the insertion tool 56 and optical fiber 30 so that the tip of the optical fiber 30 is just below the underside of the material of panel 54, the fiber feed motor 28 can be energized to reverse its direction and take up the third measured length of optical fiber 30 onto the fiber feed reel 26 to achieve the desired position of the tip of the optical fiber 30 (coated with liquid adhesive 64) just below the material of panel 54. In this manner, the implant head 14 can be moved simultaneously with any feed or take-up of the optical fiber 30 from the fiber feed reel 26 by operation of the fiber feed motor 28, with the fiber feed system 32 taking up any possible slack in the fiber 30.

Alternatively, the motion of the implant head 14 can be accomplished by providing toothed gearing within the bearing block 12 so that the cooperation of a stepper motor and the toothed gear engaging a cooperating series of teeth on each of the control arms 38, 40 will permit an upward or downward motion of the implant head 14 corresponding to the step commands provided to a stepper motor (not shown) controlling the gears. In this manner, the implant head 14 can be raised a short distance in a similar fashion to reversing the fiber feed system 32 to take up a pre-measured length of optical fiber to lift the implant head 14 the desired distance to disengage the penetration of the insertion tool 56 and position the tip of optical fiber 30 at the desired position against the underside of the material of panel 54 as described above.

The fiber gripping cam 42 is released and the implant head 14 is raised on the control arms 38, 40 to resume its rest position in the bearing block and head mount assembly 12. Once the implant head 14 returns to its rest position, the knife 44 is energized to cut the implanted optical fiber 30 at the beveled tip of the insertion tool 56 permitting the implanted optical fiber 30 to be gathered together with other implanted fibers to be organized into groups or bundles to be illuminated and provide the patterned array exhibiting sequenced motion across the panel 54.

It is not contemplated by the described apparatus and method of operation of the apparatus to include steps sufficient for assembly line manipulation of the apparatus. The foregoing description is sufficient only for implanting optical fibers in a marked, pre-determined, patterned array to be later utilized for sequenced motion in one or more frames across the display panel. Thus, the apparatus and method of operation of the optical fiber implant apparatus 10 of the present invention, in describing the manual, semi-automatic and automatic implanting of optical fibers in a display frame 54, is in accordance with the description of the apparatus and the operational steps set forth above.

The present invention may be embodied in other specific forms without departing from the spirit or essential attributes thereof and, accordingly, the described embodiments are to be considered in all respects as being illustrative and not restrictive, with the appended claims, rather than the foregoing detailed description, as indicating the scope of the invention as well as all modifications which may fall within a range of equivalency which is also intended to be embraced therein.

I claim:

1. An apparatus for implanting one or more optical fibers in a panel having a uniform planar surface, said apparatus having a frame for supporting a fiber insertion means above a fiber insertion table, said panel being interposed between said fiber insertion means and said fiber insertion table and said fiber insertion means including a means for feeding optical fiber to an implant head which carries said optical fiber downward to said fiber insertion table and pierces said panel at a desired point of insertion carrying said optical fiber to the underside of said panel through an opening in said insertion table, the improvement comprising combined means for adhering said optical fiber both to the underside and to the top side of said panel by placing measured amounts of adhesive surrounding and immediately adjacent to said optical fiber over the respective sides of said panel and exposing said adhesive to a curing mechanism causing a change in state of said adhesive resulting in permanent adherence of said optical fiber to said panel at the point of insertion.

2. The apparatus of claim 1, wherein said implant head of said fiber insertion means comprises a fiber gripping means carried within said implant head for gripping and releasing said optical fiber and an insertion tool having a central hollow through which said optical fiber passes, said insertion tool having a beveled distal end to facilitate piercing and insertion of said optical fiber into said panel.

3. The apparatus of claim 1, wherein said means for feeding optical fiber comprises a fiber feed motor for playing out and taking up optical fiber contained on a fiber feed reel.

4. The apparatus of claim 1, wherein said adhesive is selected from the group of liquid and semi-solid adhesive compounds which are state changeable upon exposure to a curing mechanism.

5. The apparatus of claim 1, wherein said curing mechanism is a source of ultra-violet light activated to cause a change of state of said adhesive from liquid to solid with a nominal exposure in a range of 5 to 15 $\mu$secs. and a light intensity in the range of 7,500 to 15,000 milliwatts.

6. The apparatus of claim 1, wherein said source of ultra-violet light is positioned obliquely outward from said point of insertion and over the applied adhesive around the optical fiber with an emanating beam of ultra-violet light focused toward said optical fiber on the top side of said panel and extending through to the underside of said panel and into the opening in said fiber insertion table.

7. The apparatus of claim 1, wherein irradiation of said adhesive surrounding said optical fiber results in formation of a bead of solid adhesive on said optical fiber and extending onto said panel at the point of insertion, said bead being substantially transparent to light.

8. The apparatus of claim 1, wherein said fiber insertion means further comprises a means for illuminating said point of insertion of said optical fiber into said panel to align said panel and said point of insertion with said implant head means.

9. The apparatus of claim 1, wherein said means for illuminating said point of insertion is positioned above said fiber insertion table and aligned to illuminate a point directly beneath said implant head means.

10. The apparatus of claim 1, wherein said frame means is moveable in a horizontal plane to align said fiber insertion means directly over said point of insertion in said panel, said panel being supported in a carrier and remaining stationary.

11. The apparatus of claim 1, wherein a carrier supporting said panel is moveable in a horizontal plane to align said fiber insertion means directly over said point of insertion in said panel, said frame means remaining stationary.

12. A method for implanting one or more optical fibers in a panel having a uniform planar surface comprising the steps of:

providing a frame for supporting a fiber insertion means above a fiber insertion table;

interposing a panel between said fiber insertion means and said fiber insertion table;

feeding optical fiber to said fiber insertion means which carries said optical fiber to said fiber insertion table;

piercing said panel at a desired point of insertion and carrying said optical fiber to the underside of said panel through an opening in said insertion table so that only the tip of said optical fiber extends through said panel;

adhering said optical fiber to the top side and to the underside of said panel by placing measured amounts of adhesive surrounding and adjacent to said optical fiber over the respective sides of said panel;

exposing said adhesive to a curing mechanism causing a change of state of said adhesive resulting in the formation of a bead of solid adhesive at the tip of said optical fiber on the underside of said panel, circumferentially surrounding said optical fiber on the top of said panel and extending onto said panel in both locations permanently adhering said optical fiber to said panel at the point of insertion.

13. The method of claim 12 further comprising the step of illuminating the point of insertion of said optical fiber into said panel to align said panel and said point of insertion with said fiber insertion means.

14. The method of claim 12 further comprising the step of moving said frame means in a horizontal plane to align said fiber insertion means directly over said point of insertion of said optical fiber into said panel, said panel being supported in a carrier and remaining stationary.

15. The method of claim 12 further comprising the step of supporting said panel in a carrier and moving said carrier in a horizontal plane to align said fiber insertion means directly over said point of insertion of said optical fiber into said panel, said frame means remaining stationary.

16. The method of claim 12, wherein the step of exposing said adhesive to a curing mechanism comprises irradiating the point of insertion of said optical fiber in both the top and undersides of said panel with ultra-violet light, exposing said adhesive causing the curing of said adhesive and the resulting change of state to a bead of solid adhesive.

17. The method of claim 12, wherein said step of irradiating said optical fiber includes exposing the applied adhesive for a time period in the range of 5 to 15 $\mu$secs. and a light intensity in the range of 7,500 to 15,000 milliwatts.

18. A method for implanting one or more optical fibers in a panel having a uniform planar surface comprising the steps of:

providing a frame means for supporting a fiber insertion means above a fiber insertion table;

interposing a panel between said fiber insertion means and said fiber insertion table;

feeding a first measured length of optical fiber to said fiber insertion means which grips and carries said optical fiber to a position immediately above said fiber insertion table;

piercing said panel at a desired point of insertion and carrying said optical fiber to the underside of said panel through an opening in said insertion table;

feeding a second measured length of optical fiber through said fiber insertion means so that the tip of said optical fiber extends through said panel and applying an adhesive to the tip of the optical fiber and to the immediately adjacent area of the underside of said panel;

applying an adhesive to the optical fiber along the top side and to the immediately adjacent area of said panel;

irradiating the applied adhesive at the tip of said optical fiber extending through the underside of and surrounding said optical fiber on the top side of said panel with ultra-violet light from a source of ultra-violet light, exposure to said ultra-violet light causing a change of state of said adhesive resulting in the formation of a bead of solid adhesive at the tip of said optical fiber on the underside of said panel and surrounding said optical fiber in the top side of said panel and extending onto said panel permanently adhering said optical fiber to said panel at the point of insertion;

releasing said optical fiber now adhered to said panel and retracting said fiber insertion means;

severing said optical fiber at a point immediate the tip of the retracted fiber insertion means resulting in a desired length of optical fiber adhered to said panel at the point of insertion.

19. The method of claim 18 further comprising the step of illuminating the point of insertion of said optical fiber into said panel to align said panel and said point of insertion with said fiber insertion means.

20. The method of claim 18 further comprising the step of moving said frame means in a horizontal plane to align said fiber insertion means directly over said point of insertion of said optical fiber into said panel, said panel being supported in a carrier and remaining stationary.

21. The method of claim 18 further comprising the step of supporting said panel in a carrier and moving said carrier in a horizontal plane to align said fiber insertion means directly over said point of insertion of said optical fiber into said panel, said frame means remaining stationary.

22. The method of claim 18, wherein the steps of feeding first and second lengths of said optical fiber include controlling a fiber feed motor for playing out and taking up optical fiber contained on a fiber feed reel.

23. The method of claim 18, wherein said step of irradiating said optical fiber includes exposing the applied adhesive for a time period in the range of 5 to 15 $\mu$secs. and a light intensity in the range of 7,500 to 15,000 milliwatts.

* * * * *